(12) United States Patent
Weich et al.

(10) Patent No.: US 7,697,444 B2
(45) Date of Patent: Apr. 13, 2010

(54) TESTING A CIRCUIT USING A SHARED BANDWIDTH TEST BUS

(75) Inventors: John D. Weich, Allen, TX (US); Jimmy O. Goodwin, Lucas, TX (US); Francois Georges Joseph Moore, Murphy, TX (US); Carl D. Reeves, Frisco, TX (US)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 11/852,017

(22) Filed: Sep. 7, 2007

(65) Prior Publication Data

US 2009/0067337 A1      Mar. 12, 2009

(51) Int. Cl.
*G01R 31/08* (2006.01)

(52) U.S. Cl. .................. 370/242; 370/249; 370/250; 714/43

(58) Field of Classification Search .................. 370/250
See application file for complete search history.

(56) References Cited

U.S. PATENT DOCUMENTS

| | | | |
|---|---|---|---|
| 4,829,515 A * | 5/1989 | Donaldson et al. .......... 370/402 |
| 5,437,049 A | 7/1995 | Carlstedt ..................... 395/800 |
| 5,574,783 A | 11/1996 | Dunn .......................... 379/230 |
| 5,608,720 A | 3/1997 | Biegel et al. ................. 370/249 |
| 6,747,978 B1 * | 6/2004 | Lewallen et al. ............. 370/401 |
| 6,754,204 B1 * | 6/2004 | Czerwiec et al. ............. 370/354 |
| 7,200,144 B2 | 4/2007 | Terrell et al. ................. 370/389 |
| 2007/0058641 A1 * | 3/2007 | Cicchetti et al. ............. 370/400 |

* cited by examiner

*Primary Examiner*—Chi H. Pham
*Assistant Examiner*—Shick Hom
(74) *Attorney, Agent, or Firm*—Baker Botts L.L.P.

(57) ABSTRACT

According to one embodiment, a method for testing a circuit includes receiving a test access session request, where the test access session request indicates that a test session is to be performed on a circuit path. A reservation message is sent to a test bus, where the reservation message reserves the test bus for the test session. The test bus includes a portion of bandwidth shared among a plurality of network elements. Traffic associated with the circuit path is copied to the test bus.

27 Claims, 2 Drawing Sheets

TESTING A CIRCUIT USING A SHARED BANDWIDTH TEST BUS

TECHNICAL FIELD

This invention relates generally to the field of communication networks and more specifically to testing a circuit using a shared bandwidth test bus.

BACKGROUND

Ring-based communication networks include network elements that provide connections of circuits to a communication ring. Often it is desirable to test the operation of a circuit coupled to a network element. In certain situations, known methods for testing these circuits path include connecting a test head to a digital cross-connect system (DCS), which is in turn connected to a network element. In such situations, the circuit under test is backhauled to the DCS through the communication ring in order for the test head coupled to the DCS to test the circuit. However, backhauling from a circuit under test through a communication ring in order to test the circuit is not efficient in certain situations.

SUMMARY OF THE DISCLOSURE

In accordance with the present invention, disadvantages and problems associated with testing circuits in a communication network may be reduced or eliminated.

According to one embodiment, a method for testing a circuit includes receiving a test access session request, where the test access session request indicates that a test session is to be performed on a circuit path. A reservation message is sent to a test bus, where the reservation message reserves the test bus for the test session. The test bus includes a portion of bandwidth shared among a plurality of network elements. Traffic associated with the circuit path is copied to the test bus.

Certain embodiments may provide one or more technical advantages. A technical advantage of one embodiment may be that network elements share the same test bus. This may result in a minimizing network bandwidth usage. Another technical advantage of some embodiments is that a network element equipped with a test access device may perform testing for other network elements at other locations.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
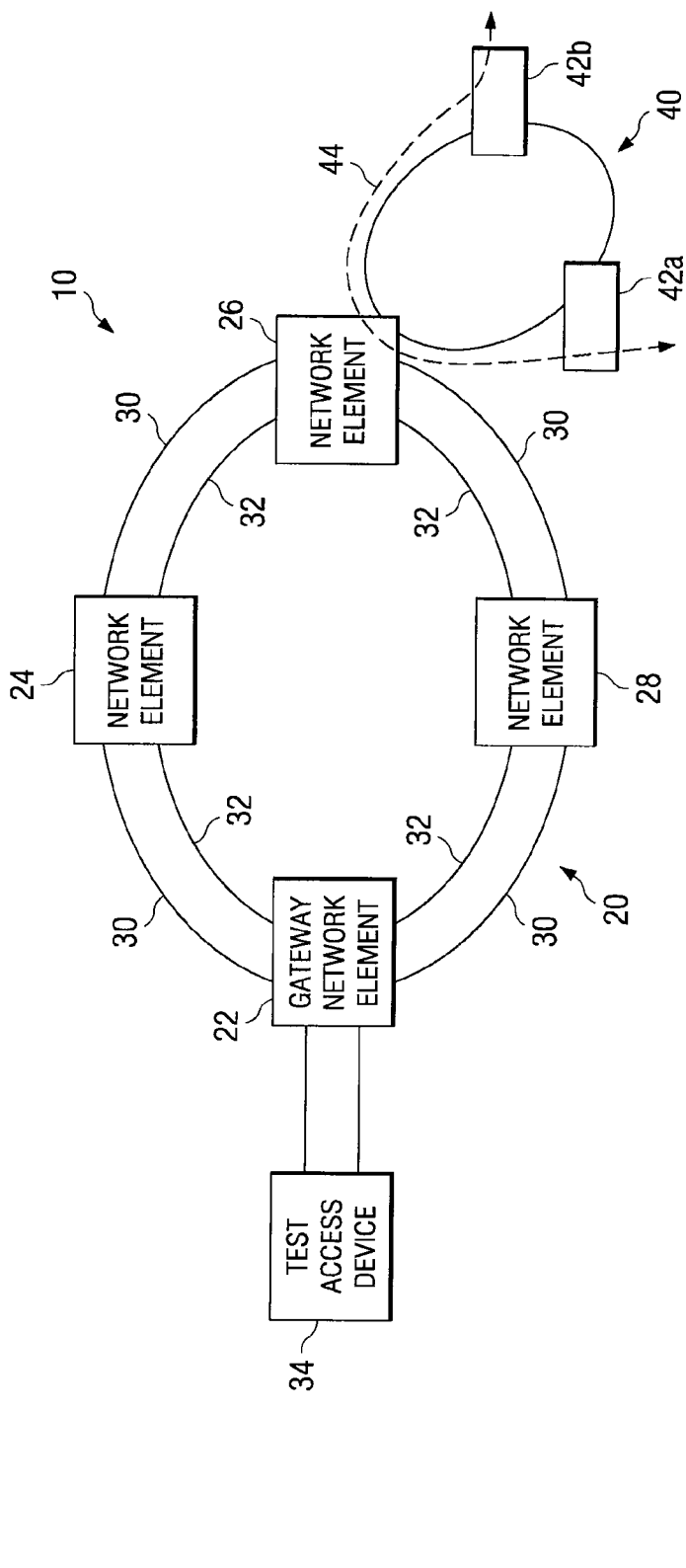
FIG. 1 is a block diagram illustrating a network system for testing a circuit using a shared bandwidth test bus.
Figure 3:
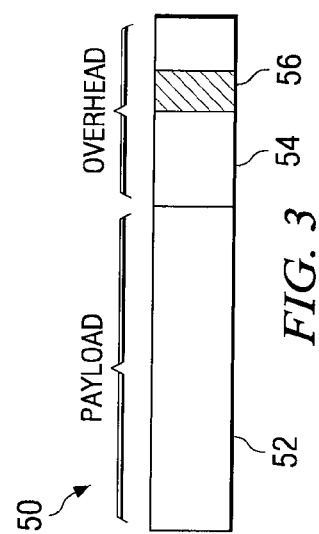
FIG. 3 illustrates one embodiment of a packet for managing test session that use the test bus.
Figure 2:
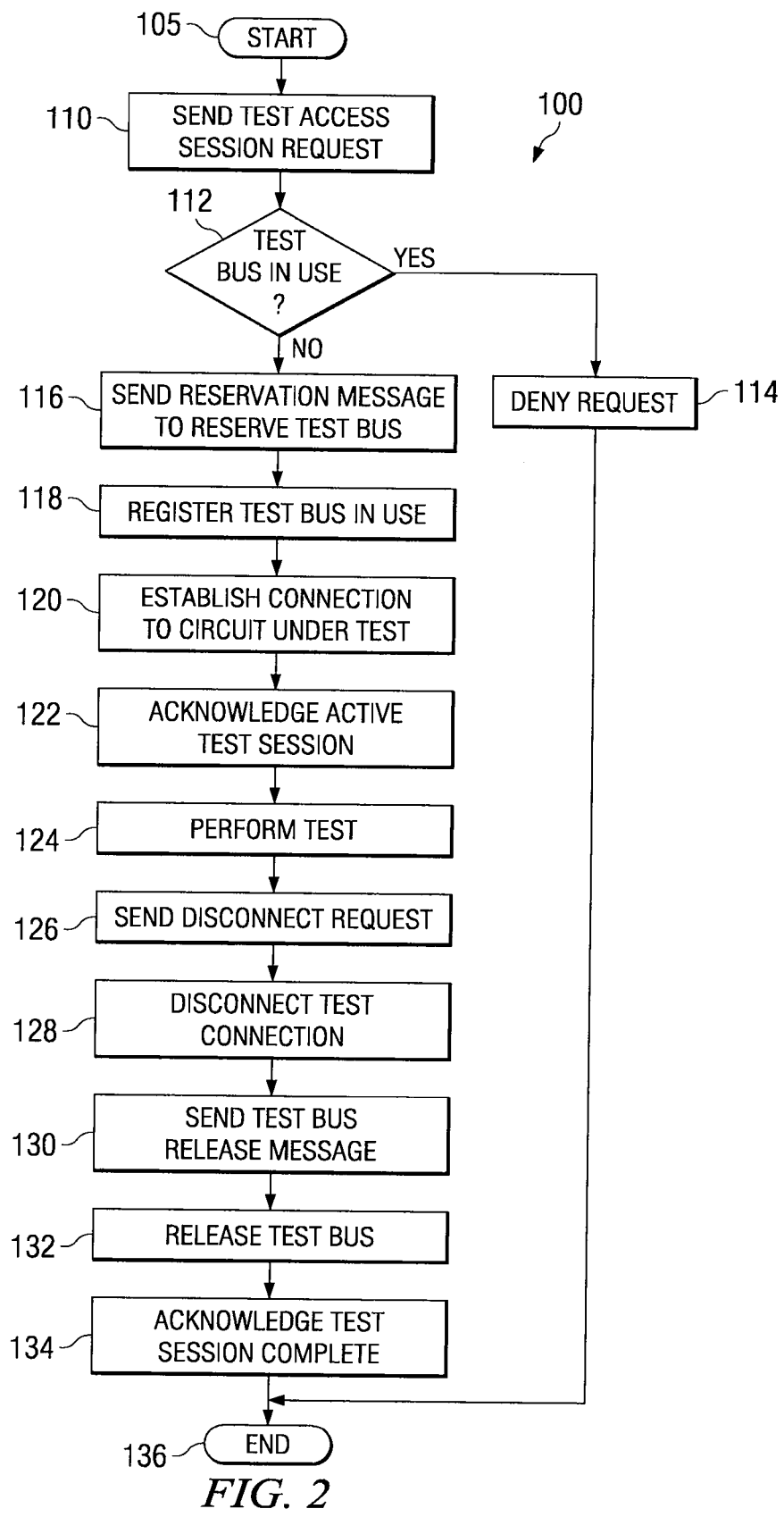
FIG. 2 illustrates one embodiment of a method for testing a circuit using a shared bandwidth test bus.

Embodiments of the present invention and its advantages are best understood by referring to FIGS. 1 through 3 of the drawings, like numerals being used for like and corresponding parts of the various drawings.

FIG. 1 is a block diagram illustrating a network system 10 for testing a circuit using a shared bandwidth test bus. In accordance with various embodiments, network elements tap into a shared bandwidth test bus. The test bus allows testing of a circuit coupled to a network element using a bandwidth that is shared among network elements in a communication system.

According to the illustrated embodiment, network system 10 includes a ring network 20, a test access device 34, gateway network element 22, network elements 24, 26, and 28, and network nodes 42a and 42b. In one embodiment, ring network 20 communicates information through signals. A signal may comprise an optical signal transmitted as light pulses. As an example, an optical signal may have a frequency of approximately 1550 nanometers and a data rate of less than 10, 10, 20, 40, or over 40 gigabits per second. For example, the data rate may be 2.5 gigabits per second, such as for a Synchronous Optical Network (SONET) OC-48 signal, or 155 megabits per second, such as for a SONET OC-3 signal. A signal may comprise a synchronous transport signal (STS) that communicates information in packets. Information may include voice, data, audio, video, multimedia, control, signaling, and/or other information.

According to one embodiment, ring network 20 may comprise an optical fiber ring. Ring network 20 may be implemented using protocols such as Resilient Packet Ring (RPR) protocols. Ring network 20 may utilize any suitable transmission technique to transport packets on the ring network 20, such as Ethernet, Synchronous Optical Network (SONET), or wavelength division multiplexing (WDM) techniques.

Various embodiments of ring network 20 may be configured in a number of network topologies including, but not limited to, Unidirectional Path Switched Ring (UPSR) and Bi-directional Line Switched Ring (BLSR) topologies.

The gateway network element 22 and network elements 24, 26, and 28 are coupled by fibers 30 as shown. A network element includes hardware and/or software that provides one or more network functions or network services In one embodiment, each of the gateway network element 22 and network elements 24, 26, and 28 comprise a Synchronous Optical Network (SONET) network element. Examples of network elements include an add/drop multiplexer (ADM), a digital cross-connect (DXC), a terminal multiplexer, a regenerator, and a digital loop carrier (DLC). The gateway network element 22 functions as a gateway allowing the test access device 34 to communicate with network elements 24, 26, and 28.

Fibers 30 represent any suitable fibers operable to transmit a signal, such as optical fibers. A fiber 30 communicates one or more channels, where a channel represents a signal of a particular wavelength.

According to one embodiment, a portion of the bandwidth of fibers 30 are used as a shared bandwidth test bus 32. Gateway network element 22 and network elements 24, 26, and 28 transmit test information associated with a circuit under test on test bus 32. In at least one embodiment, the test bus 32 is bi-directional, so that test traffic can be passed in either or both directions around the network ring 20.

In accordance with at least one embodiment, the bandwidth of fibers 30 is provisioned into a predetermined number of time slots, and one or more of the time slots are reserved for use as the test bus 32. In accordance with one embodiment, messages transmitted on the test bus 32 between the gateway network element 22 and network elements 24, 26, and 28 comprise semaphore Open Systems Interconnection (OSI)

messages that are transmitted on a SONET data communication channel (SDCC) channel reserved for the test bus 32. The SDCC is a operations channel used in SONET to communicate between network elements. In various embodiments, the SDCC is assigned one or more synchronous transport signal (STS) time-slots. In various embodiments, the shared bandwidth of the test bus 32 minimizes network bandwidth required for testing.

In one embodiment, a circuit 40 includes the network element 26 coupled to one or more network nodes 42a and 42b. Network nodes 42a and 42b may include one or more components, terminals, network elements, or other telecommunication equipment in the circuit 40. In one embodiment, the circuit 40 is a customer circuit providing access by a customer to the ring 20. The circuit 40 includes a circuit under test 44 that is desired to be tested. The circuit under test 44 includes a portion or path of the circuit 40 that couples network element 26 and one or more of network nodes 42a and 42b.

In at least one embodiment, a test access device 34 is coupled to the gateway network element 22 to test the circuit under test 44. In one embodiment, the test access device 34 is a test head. Examples of tests that the test access device 34 may perform on the circuit under test 44 include testing for faults in one or more connections in the circuit under test 44, or testing for the proper functioning of one or more of network nodes 42a and 42b in the circuit under test 44.

The test access device 34 sends a test access session request addressed to the network element 26 requesting that a test session be established with the circuit under test 44. During the test session, the network element 26 copies all or some of the traffic on the circuit under test 44 to the test bus 32. The test access device 34 receives the traffic via the test bus 32, and analyzes the traffic to determine one or more test results.

In various embodiments, the test access device 34 is operable to perform testing procedures on a circuit or circuit path coupled to gateway element 22 or network elements 24, 26, and 28 while connected to gateway network element 22. In at least one embodiment, the test access device 34 may monitor the shared bandwidth of the test bus 32 when the test bus 32 is not in use in order to verify the integrity of the test bus 32.

A device of system 10 may include logic, an interface, memory, other component, or any suitable combination of the preceding. Logic includes hardware, software, other logic, or any suitable combination of the preceding. Certain logic may manage the operation of a device, and may comprise, for example, a processor that executes instructions and manipulates data to perform operations.

An interface receives input, sends output, performs suitable processing of the input or output or both, or any combination of the preceding, and may comprise one or more ports, conversion software, or both. Memory stores and facilitates retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to network system 10 without departing from the scope of the invention. The components of network system 10 may be integrated or separated according to particular needs. Moreover, the operations of network system 10 may be performed by more, fewer, or other devices. Additionally, operations of network system 10 may be performed using any suitable logic. As used in this document, "each" refers to each member of a set or each member of a subset of a set.

System 10 eliminates the need for using a digital cross-connect system (DCS) to test a circuit. Backhauling a circuit under test to a DCS to test the circuit ties up bandwidth, and backhauling over long distances increases error susceptibility. In addition, it is labor intensive to test circuits covering longer and/or multiple spans using backhauling.

System 10 also does not require that a test access device 34 be co-located with a network element of the circuit under test 44. Thus, the test access device 34 may be deployed at a network element not on the circuit under test 44. Moreover, a test access device 34 need not be used for each network element of a communication system.

FIG. 2 illustrates one embodiment of a method for testing a circuit using a shared bandwidth test bus. The method 100 begins at step 105. At step 110, the test access device 34 sends a test access session request to the network element 26 indicating that the circuit under test 44 is to be tested. In at least one embodiment, the test access session request is first sent from the test access device 34 to the gateway network element 22, and then sent to the network element 26 over the test bus 32. In at least one embodiment, test access device 34 sends the test access session request in response to receiving a command or instruction from a user of the test access device 34.

In step 112, the network element 26 determines if the test bus 32 is currently in use. If the test bus 32 is in use, the network element 26 denies the request for the test session in step 114, and the method 100 terminates in a step 136. In some embodiments, only one test session may be initiated on the test bus 32 at a particular time. However, in other embodiments, more than one test session may be initiated on the test bus 32 at a particular time.

If the test bus 32 is determined in step 112 to not be in use, the network element 26 sends a reservation message around the test bus 32 to reserve the test bus 32 for the test session in step 116. In accordance with one embodiment, the reservation message comprises a semaphore Open Systems Interconnection (OSI) message that is transmitted on a SONET data communication channel (SDCC) channel reserved for the test bus 32. In step 118, in response to receiving the reservation message, gateway network element 22, and network elements 24 and 28 register in an internal state that the test bus 32 is in use by, for example, setting a software bit.

In step 120, the network element 26 establishes a connection between the circuit under test 44 and the test bus 32 by bridging the circuit under test 44 and the test bus 32. In step 122, the network element 26 sends an acknowledgement message on the test bus 32 that the test session is active. The acknowledgement message is received by gateway network element 22 and network elements 24 and 28. In step 124, the test access device 34 performs the test of the circuit under test 44. During the test, all or some of the traffic on the circuit under test 44 is copied to the test bus 32 by the network element 26, and sent via the test bus 32 to the test access device 34 through the gateway network element 22. Upon receiving the copy of the traffic on the circuit under test 44, the test access device 34 analyzes the traffic to determine one or more test results.

In step 126, the test access device 34 sends a disconnect request to the network element 26 to indicate that the test is completed. In step 128, the network element 26 receives the disconnect request and disconnects the connection between the circuit under test 44 and the test bus 32. In step 130, the network element 26 sends a release message over the test bus 32 to gateway network element 22 and network elements 24 and 28 indicating that the test bus 32 is now available. In accordance with one embodiment, the release message comprises an Open Systems Interconnection (OSI) message that is transmitted on the SDCC channel reserved for the test bus 32. In step 132, the network element 26 releases the test bus 32. In step 134, the network element 26 sends an acknowledgement message to the test access device 34 indicating that the test access session is complete. In step 136, the method 100 ends.

Modifications, additions, or omissions may be made to the method without departing from the scope of the invention. The method may include more, fewer, or other steps. Additionally, steps may be performed in any suitable order without departing from the scope of the invention.

FIG. 3 illustrates one embodiment of a packet 50 for managing test sessions that use test bus 32. In various embodiments, test bus management attempts to prevent initiating more than one test session on the test bus 32 at the same time. In various embodiments, a reservation message is sent prior to a test to reserve the test bus 32, and a release message is sent to release the test bus 32 after the test is completed.

The packet 50 is used to send either a reservation message or release message on the test bus 32. In accordance with one embodiment, the packet 50 is a SONET data communication channel (SDCC) packet. The packet 50 comprises of a payload portion 52 and an overhead portion 54 that includes a test bus portion 56 used for test bus reservation messaging. In one embodiment, the test bus portion 56 includes a flag that is set to "reserved" to indicate that the test bus 32 has been reserved for a test session and not available. The flag is set to "cleared" to indicate that the test bus 32 has been released and is available. In one example, the network element 26 sends a reservation message comprising a packet 50 having the flag of the test bus portion 56 set to "reserved". In another example, the network element 26 sends a release message comprising a packet 50 having the flag of the test bus portion 56 set to "cleared".

In another embodiment, the test bus 32 is reserved at the element management level (EMS). In this embodiment, a network EMS allocates the test bus 32 to a specific network element, such as network element 26. The network element 26 then performs the test of the circuit under test 44, and the EMS releases the test bus 32.

In still another embodiment, the test bus 32 is reserved by messaging over SDCC. In this embodiment, when a network element 26 initiates a test of the circuit under test 44, the network element 26 sends a request for reservation of the test bus 32 over the test bus 32. Other network elements, such as network elements 24 and 28, and gateway network element 22 are blocked from access to the test bus 32 until the test is completed. When the test is completed, the network element 26 releases the test bus 32.

It should be understood that other methods of reserving and releasing the test bus 32 may be used without departing from the teachings of the present disclosure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for testing a circuit, comprising:
   receiving a test access session request, the test access session request indicating that a test session is to be performed on a circuit path;
   sending a reservation message to a test bus, the reservation message reserving the test bus for the test session, the test bus comprising a portion of bandwidth shared among a plurality of network elements; and
   copying traffic associated with the circuit path to the test bus.

2. The method of claim 1, further comprising:
   connecting the test bus to the circuit path.

3. The method of claim 1, further comprising:
   receiving a disconnect request; and
   disconnecting the test bus from the circuit path.

4. The method of claim 1, further comprising:
   sending a release message to the test bus, the release message indicating that the test bus is available; and
   releasing the test bus.

5. The method of claim 1, further comprising:
   sending an acknowledgement message indicating that the test session is complete.

6. The method of claim 1, further comprising:
   sending a message comprising a packet having a flag indicating either that the test bus is available or that the test bus is not available.

7. The method of claim 1, wherein sending the reservation message further comprises:
   determining that the test bus is available; and
   sending the reservation message if the test bus is available.

8. The method of claim 1, wherein receiving the test access session request further comprises:
   receiving the test access session request from a test access device.

9. The method of claim 1, wherein the test bus comprises a time slot of a plurality of time slots, the time slot reserved for the test bus.

10. A network element for facilitating testing of a circuit, comprising:
    an interface operable to:
       receive a test access session request, the test access session request indicating that a test session is to be performed on a circuit path; and
    one or more processors coupled to the interface and operable to:
       send a reservation message to a test bus, the reservation message reserving the test bus for the test session, the test bus comprising a portion of bandwidth shared among a plurality of network elements; and
       copy traffic associated with the circuit path to the test bus.

11. The network element of claim 10, the one or more processors further operable to:
    connect the test bus to the circuit path.

12. The network element of claim 10, the one or more processors further operable to:
    receive a disconnect request; and
    disconnect the test bus from the circuit path.

13. The network element of claim 10, the one or more processors further operable to:
    send a release message to the test bus, the release message indicating that the test bus is available; and
    release the test bus.

14. The network element of claim 10, the one or more processors further operable to:
    send an acknowledgement message indicating that the test session is complete.

15. The network element of claim 10, the one or more processors further operable to:
    send a message comprising a packet having a flag indicating either that the test bus is available or that the test bus is not available.

16. The network element of claim 10, further operable to send the reservation message by:
   determining that the test bus is available; and
   sending the reservation message if the test bus is available.

17. The network element of claim 10, further operable to receive the test access session request by:
   receiving the test access session request from a test access device.

18. The network element of claim 10, wherein the test bus comprises a time slot of a plurality of time slots, the time slot reserved for the test bus.

19. Logic encoded in one or more data storage media for execution, and when executed operable to:
   receive a test access session request, the test access session request indicating that a test session is to be performed on a circuit path;
   send a reservation message to a test bus, the reservation message reserving the test bus for the test session, the test bus comprising a portion of bandwidth shared among a plurality of network elements; and
   copy traffic associated with the circuit path to the test bus.

20. The logic of claim 19, further operable to:
   connect the test bus to the circuit path.

21. The logic of claim 19, further operable to:
   receive a disconnect request; and
   disconnect the test bus from the circuit path.

22. The logic of claim 19, further operable to:
   send a release message to the test bus, the release message indicating that the test bus is available; and
   release the test bus.

23. The logic of claim 19, further operable to:
   send an acknowledgement message indicating that the test session is complete.

24. The logic of claim 19, further operable to:
   send a message comprising a packet having a flag indicating either that the test bus is available or that the test bus is not available.

25. The logic of claim 19, further operable to send the reservation message by:
   determining that the test bus is available; and
   sending the reservation message if the test bus is available.

26. The logic of claim 19, further operable to receive the test access session request by:
   receiving the test access session request from a test access device.

27. The logic of claim 19, wherein the test bus comprises a time slot of a plurality of time slots, the time slot reserved for the test bus.

* * * * *